(12) United States Patent
Barthe et al.

(10) Patent No.: US 11,981,414 B2
(45) Date of Patent: May 14, 2024

(54) METHOD AND SYSTEM FOR MANUFACTURING AN AEROSTAT WITH A RIGID STRUCTURE, AND HEAVY-LOAD-CARRYING AEROSTAT MANUFACTURED IN THIS WAY

(71) Applicant: Flying Whales, Suresnes (FR)

(72) Inventors: Clément Barthe, Suresnes (FR); Emmanuel Crespin, Suresnes (FR); Jean-Marie Gourlin, Suresnes (FR)

(73) Assignee: FLYING WHALES, Suresnes (FR)

( * ) Notice: Subject to any disclaimer, the term of this patent is extended or adjusted under 35 U.S.C. 154(b) by 94 days.

(21) Appl. No.: 17/597,684

(22) PCT Filed: Jul. 17, 2020

(86) PCT No.: PCT/FR2020/051296
§ 371 (c)(1),
(2) Date: May 16, 2022

(87) PCT Pub. No.: WO2021/014082
PCT Pub. Date: Jan. 28, 2021

(65) Prior Publication Data
US 2023/0211866 A1   Jul. 6, 2023

(30) Foreign Application Priority Data

Jul. 19, 2019   (FR) ...................................... 1908229

(51) Int. Cl.
*B64B 1/08* (2006.01)
*B64F 5/10* (2017.01)

(52) U.S. Cl.
CPC . *B64B 1/08* (2013.01); *B64F 5/10* (2017.01)

(58) Field of Classification Search
CPC ..... B64B 1/00; B64B 1/08; B64B 1/22; B64F 5/10; B66F 5/00; B66F 5/025; B66F 7/00; B66F 7/10; B66F 7/12; B66F 7/16
See application file for complete search history.

(56) References Cited

U.S. PATENT DOCUMENTS

| 1,191,077 | A | * | 7/1916 | Hermanson | ............... B64B 1/00 |
| | | | | | 244/125 |
| 1,559,807 | A | | 11/1925 | Thaden et al. | |

(Continued)

OTHER PUBLICATIONS

José, A., Marques. "Conceptual Design of a Hybrid Airship Engenharia Aeronáutica (Ciclo de estudos integrado)." Retrieved Jun. 13, 2023, from https://ubibliorum.ubi.pt/bitstream/10400.6/5473/1/3744_7425.pdf (Year: 2014).*

(Continued)

*Primary Examiner* — Joshua J Michener
*Assistant Examiner* — Ka Chun Leung
(74) *Attorney, Agent, or Firm* — TraskBritt

(57) ABSTRACT

A method for erecting the structure of an aerostat in successive horizontal sections, starting from the top horizontal section, including an iteration of the following steps, starting from a current state of completion of the aerostat structure, lifting the current state of the structure, at first lifting points, by means of lifting means arranged in a current transverse position; placing a support device in line with second lifting points for lifting the current state of the structure; transferring the current state of the structure from the lifting means to the support device; moving the lifting means to another transverse position; completely assembling the horizontal section immediately below the current state of the structure on the structure.

18 Claims, 5 Drawing Sheets

(56) References Cited

U.S. PATENT DOCUMENTS

| | | | | |
|---|---|---|---|---|
| 1,651,754 A | * | 12/1927 | Durr | B23P 19/00 |
| | | | | 29/469 |
| 3,129,911 A | * | 4/1964 | Fitzpatrick | B64B 1/00 |
| | | | | 244/125 |
| 4,259,776 A | * | 4/1981 | Roda | B64B 1/06 |
| | | | | 29/469 |

OTHER PUBLICATIONS

Sara Black. "Don't Call It a Blimp!" 2014. Www.compositesworld. com. Apr. 30, 2014. https://www.compositesworld.com/articles/dont-call-it-a-blimp. (Year: 2014).*

Goodyear, "Goodyear's Blimp Time-Laps Build in Blimp Hanger", YouTube, Retrieved from the internet: https://www/youtube.com/watch?v=vve*hh9_xGI, Mar. 14, 2014, 1 page.

International Search Report for International Application No. PCT/FR2020/051296 dated Nov. 11, 2020, 2 pages.

International Written Opinion for International Application No. PCT/FR2020/051296 dated Nov. 11, 2020, 6 pages.

* cited by examiner

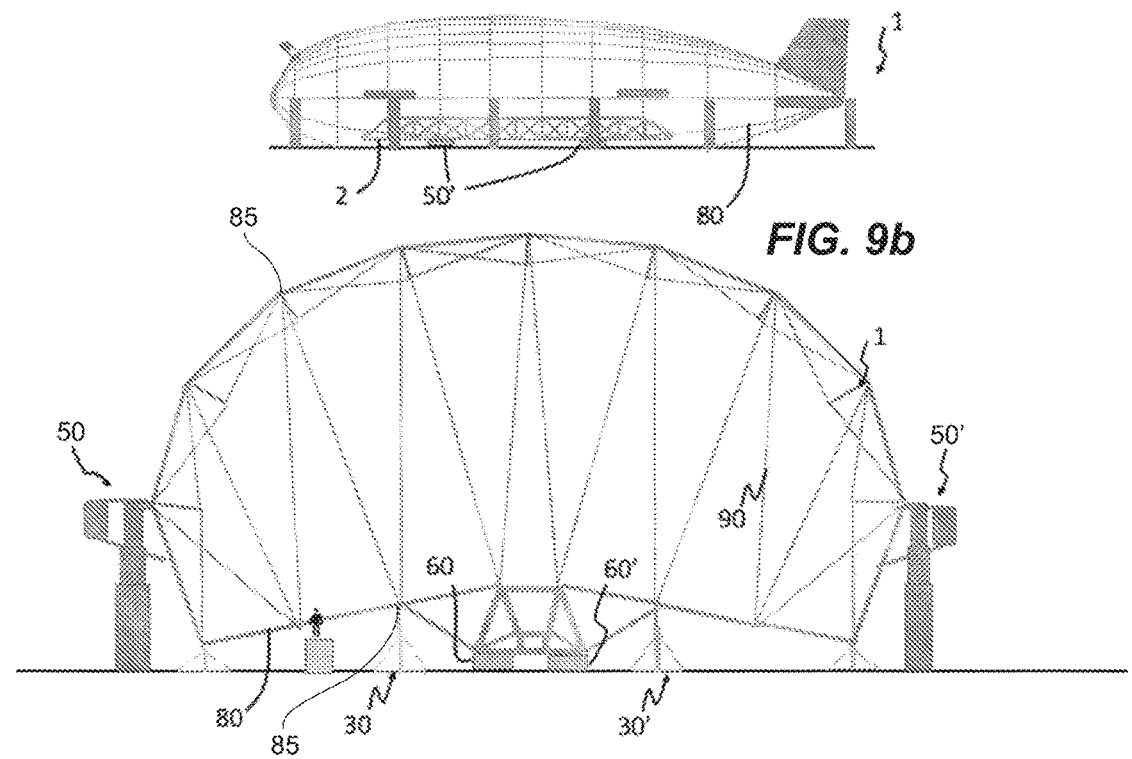
FIG. 9b
FIG. 9a
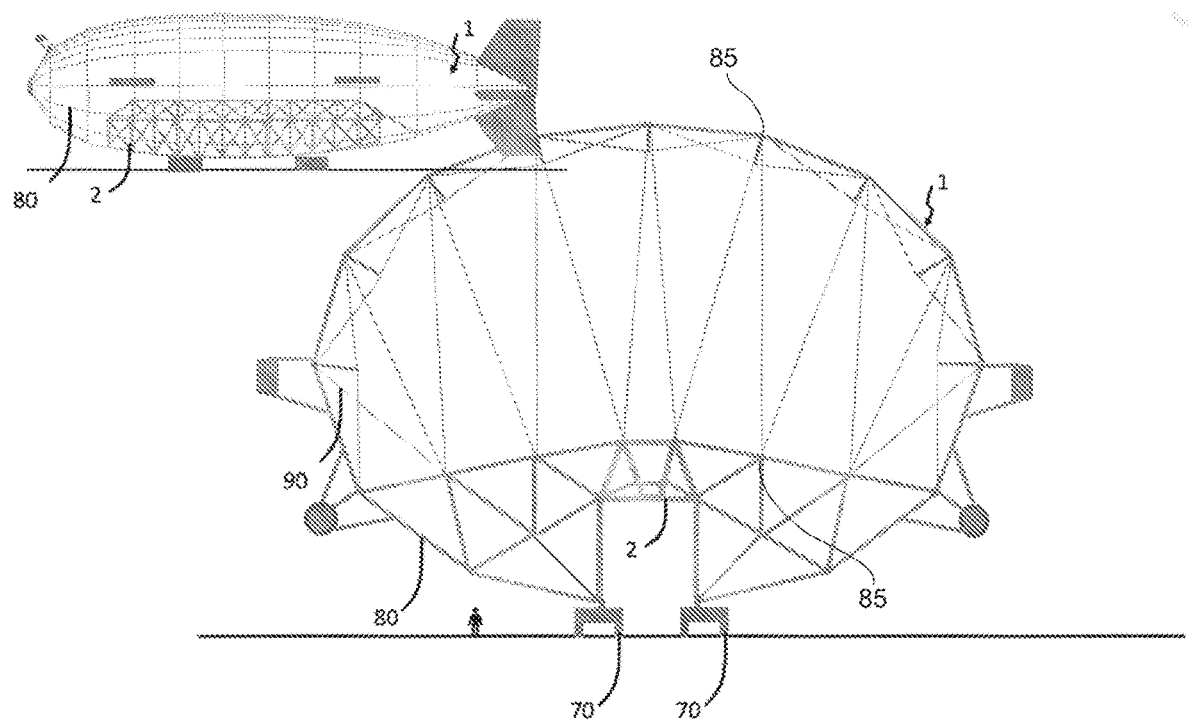
FIG. 10

METHOD AND SYSTEM FOR MANUFACTURING AN AEROSTAT WITH A RIGID STRUCTURE, AND HEAVY-LOAD-CARRYING AEROSTAT MANUFACTURED IN THIS WAY

CROSS-REFERENCE TO RELATED APPLICATIONS

This application is a national phase entry under 35 U.S.C. § 371 of International Patent Application PCT/FR2020/051296, filed Jul. 17, 2020, designating the United States of America and published as International Patent Publication WO 2021/014082 A1 on Jan. 28, 2021, which claims the benefit under Article 8 of the Patent Cooperation Treaty to French Patent Application Serial No. FR1908229, filed Jul. 19, 2019.

TECHNICAL FIELD

This present disclosure relates to a method for manufacturing an aerostat with a rigid structure. It also relates to a system for manufacturing an aerostat, as well as a heavy-load-carrying aerostat manufactured by implementing this method.

The field of the present disclosure is more particularly, but in a non-limiting manner, that of airships with a rigid structure, in particular, that of airships carrying heavy loads.

BACKGROUND

The present disclosure relates to a method for manufacturing airships.

U.S. Pat. No. 1,559,807 is known, which proposes a method for manufacturing airships, in particular, all-metal airships, in which the work is facilitated with respect to the methods according to the prior art and is very precise because of the manufacture of the airship by gradually adding portions to the completed part to complete the entire structure in place, thus avoiding the assembly of preformed sub-assemblies.

Furthermore, according to the method described in this prior art, the riveting of the stringers and the attachment of the skin of the airship are facilitated by the work on the ground of the workers.

The method proposes to build the airship in successive horizontal sections, starting from the upper horizontal section. The entire structure of this section, including the curved tops of the transverse circular beams, stringers, skin, and all fittings, is manufactured on the hangar floor. Cables from the roof of the hangar are fixed at appropriate places in the completed section, which is then lifted by means of suitable winches to which the cables are fixed. The upper horizontal section is raised to a height equal to the thickness of the section to be produced, which is located below. The operation is repeated until the manufacture of the airship is completed.

Even if the solution proposed by the prior art is worthy of appreciation, it is not entirely satisfactory. In fact, it requires having a hangar provided with a rail extending longitudinally, with respect to the hangar, and in the longitudinal vertical plane of the aerostat when the aerostat is finished. The monorail must be equipped with a plurality of winches and cables starting from each winch.

Also, the installation of this equipment stresses the structure of the building; this equipment is not easily movable in other hangars, for example, to be used there for another aerostat. Furthermore, the parts being assembled are not maintained mechanically.

BRIEF SUMMARY

One aim of the present disclosure is notably to remedy all or part of the aforementioned drawbacks.

According to a first aspect of the present disclosure, a method is proposed for erecting the structure of an aerostat by successive horizontal sections, starting with the upper horizontal section, comprising an iteration of the following steps, starting with a current state of manufacture of the structure of the aerostat, lifting the current state of the structure, at first lifting points, by lifting means arranged in a current transverse position, placing a support device in line with a second lifting point of the current state of the structure, transferring the current state of the structure from the lifting means to the support device, moving the lifting means to another transverse position, which is the current position of the lifting means of the state following the current state, fully assembling the horizontal section immediately below the current state of the structure on the structure.

The step of transferring the current state of the structure by lifting means on the support device may be carried out by lowering the current state of the structure by the lifting means and placing the current state of the structure in the rest state on the support device.

The step of lifting the current state of the structure may advantageously be carried out by jacks but also by lifting winches arranged above the structure being assembled. These two means may be used in combination. The lifting winches may advantageously be implemented in a so-called equator assembly phase corresponding to the maximum width of the structure being assembled.

According to other advantageous and non-limiting features of the present disclosure, taken alone or in any technically practicable combination:

the lifting means comprise jacks;
the first lifting points are arranged at the transverse support ends of the aerostat;
the structure is lifted at transverse ends of the structure.

The manufacturing method may further comprise the following steps: a step for arranging a cargo hold structure is arranged inside the structure being erected;
the cargo hold structure is placed on lifting tables,
the iterative assembly step comprises a step for assembling the cargo hold structure so as to mechanically couple it to the horizontal section being assembled by means of beams.

The manufacturing method according to the present disclosure further comprises a plurality of steps for connecting determined points of the upper part of the structure already assembled to determined points of the beams for mechanically coupling the cargo hold structure to the structure.

According to yet another aspect of the present disclosure, a system is proposed for erecting the structure of an aerostat by successive horizontal sections, starting with the upper horizontal section, implementing the manufacturing method according to the present disclosure, comprising:

lifting means arranged in a current transverse position, provided for lifting the current state of the structure at first lifting points, means for placing a support device in line with second lifting points of the current state of the structure, means for transferring the current state of the structure by the lifting means onto the support device, so as to lower the current state of the structure by the lifting means and to rest the current state of the structure on the support device, means for moving the lifting means to another transverse position [which is the current position of the lifting means of the state following the current state], means for fully assembling the horizontal section immediately below the current state of the structure on the structure.

The erection system according to the present disclosure may also advantageously comprise means for arranging a cargo hold structure inside the structure being erected.

The means for arranging the cargo hold structure may comprise lifting tables on which the cargo hold structure is placed.

The assembly means may also be arranged to assemble the cargo hold structure so as to couple it mechanically to the horizontal section being assembled by means of beams.

The erection system according to the present disclosure may then comprise means for connecting determined points of the upper part of the structure already assembled to determined points of the beams for mechanically coupling the cargo hold structure to the structure.

According to another aspect of the present disclosure, a heavy-load-carrying aerostat is proposed, which is manufactured by implementing the erection method according to the present disclosure.

Preferably, the aerostat has a structure comprising a rigid skeleton covered with a flexible envelope and containing balloons of carrier gas. The skeleton is an assembly of beams arranged in transverse frames and longitudinal stringers and stiffened by a system of tensioned elements. The carrier gas balloons are distributed along the length of the aerostat.

When this aerostat comprises a cargo hold designed to receive a load, this cargo hold comprises a cargo hold structure mechanically coupled to the structure of the aerostat, on the one hand, by a set of beams arranged transversely on either side of the cargo hold structure and mechanically connected to the side faces of the structure, and on the other, by a set of cables stretched between determined points of the coupling beams and determined points of the upper part of the structure. This arrangement is obtained for the "main" frames separating the carrier gas balloons.

The transverse beams may advantageously comprise lattice beams made of composite tubes made of pultruded carbon, and the cables comprise solid section composite rods made of pultruded carbon. The aerostat then comprises articulated connections of the cables to the coupling beams and to the upper part of the structure. These articulated connections may comprise metal parts.

The beams between the cargo hold structure and the main structure ensure the stability of the lower part. The cables stretched between these beams and the upper part of the main structure transmit the forces between the cargo hold supporting the payload and the upper part supporting the lifting forces resulting from the aerostatic pressure of the helium.

The structure as a whole is self-supporting. It has a resistance and stability allowing it to support its own weight and that of the various pieces of equipment without the presence of the carrier gas. The self-supporting capacity of the structure also applies to the intermediate states of its assembly by successive horizontal sections. This capacity is made possible by an arrangement of rigid beams and tensioned elements around the periphery of the main frames separating the carrier gas balloons.

According to another aspect of the present disclosure, a computer program product is proposed, which is downloadable from a communication network and/or stored on a computer-readable medium and/or executable by a microprocessor, and loadable in an internal memory of a processing unit, characterized in that it comprises program code instructions, which, when executed by the processing unit, implement the steps of the method according to the first aspect of the present disclosure, or one or several of its improvements.

BRIEF DESCRIPTION OF THE DRAWINGS

Other advantages and particularities of the present disclosure will become apparent on reading the detailed description of implementations and embodiments, which are in no way limiting, with reference to the accompanying drawings, in which:

FIGS. 1 to 10 illustrate a succession of steps of a method according to the present disclosure and a device according to the present disclosure suitable for implementing the method according to the present disclosure.

DETAILED DESCRIPTION

Since the embodiments described hereinafter are not limiting in nature, it is possible, in particular, to consider variants of the present disclosure that comprise only a selection of the features that are described, provided that this selection of features is sufficient to confer a technical advantage or to differentiate the present disclosure from the prior art. This selection comprises at least one preferably functional feature without structural details, or with only a portion of the structural details if this portion alone is sufficient to confer a technical advantage or to differentiate the present disclosure from the prior art.

In the figures, an element appearing in a plurality of figures retains the same reference.

Referring to FIG. 1, there is described an initial phase of construction of an airship 1 by successive horizontal sections, starting with the upper horizontal section.

Each of FIGS. 1 to 9 comprise a sub-figure a showing a front view of the current state of construction of the airship 1, and a sub-figure b showing a longitudinal view, from the left side, of the current state of construction of the airship 1.

The presence of a manufacturing device 10 according to an embodiment according to the present disclosure is shown, comprising two pluralities of lifting columns 20 and 20' rising from a surface of an assembly zone.

Figure 1B:
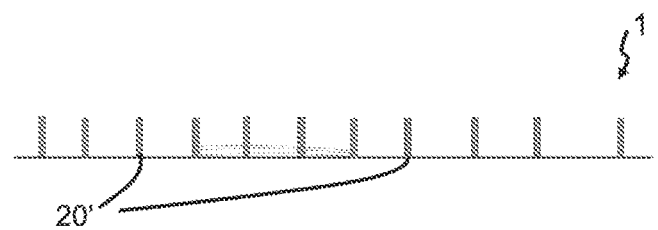

As illustrated more particularly in FIG. 1B, the plurality of columns 20' is aligned on a left side of the airship, while the plurality of columns 20 is aligned on a right side of the airship.

Each column 20 corresponds to a column 20' in a transverse plane of the airship under construction.

Each of the lifting columns has a lifting truck arranged to be slidably mounted vertically on the lifting column, according to a displacement of 10 meters, and to be controlled by a control handle in the form of a reinforced shaft or a pedal.

A tripod 30 is arranged in the center of these two columns.

Figure 1A:
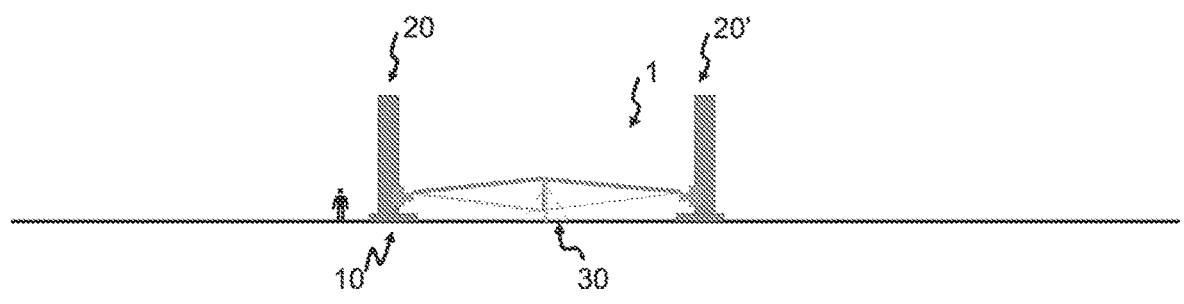

As is more particularly visible in FIG. 1a, various cables and stringers for fixing connection parts are implemented.

The envelope panels are also installed, as well as the communication networks and the positioning of the helium cell.

As is better seen in FIG. 1b, this installation is carried out not only on a transverse part of the upper section, but also all along the longitudinal extension of the upper section.

Also, the entire structure of this section, including the curved upper parts of the transverse circular beams, the stringers, the skin, and all the fittings, is manufactured on the floor of the hangar.

As may be seen in FIG. 1a, the weight of the airship is distributed laterally on the lifting columns 20 and 20' and on the tripod 30 in the center.

Figure 2B:
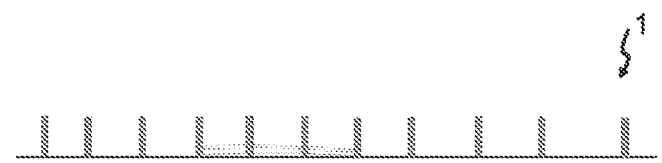
Figure 2A:
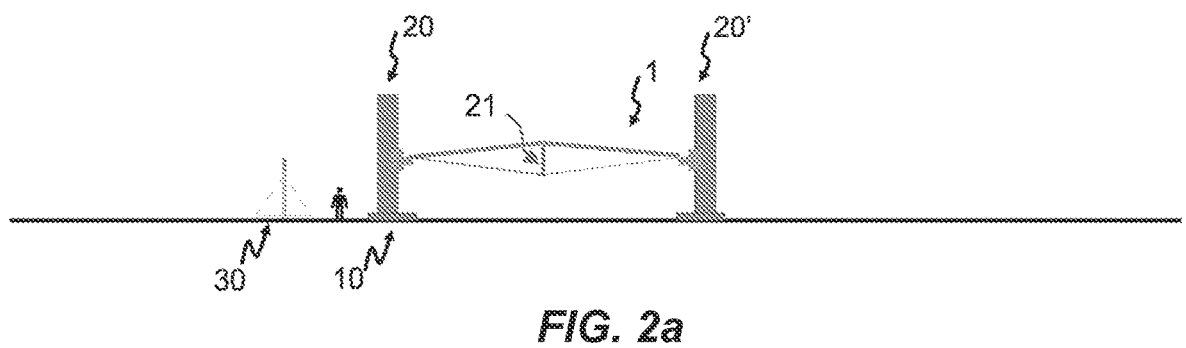

With reference to FIG. 2, a step is described, which follows the step described with reference to FIG. 1. As shown more particularly in FIG. 2a, the airship is raised to a height suitable for the construction of the next horizontal section.

In this state, the weight of the airship is distributed laterally on the lifting columns 20 and 20' at two support points, freeing the tripod 30, which may be moved.

This is made possible by the vertical structural stability of the section stiffened by a cable bracing system 21 at the main frames separating the helium balloons.

Figure 3B:
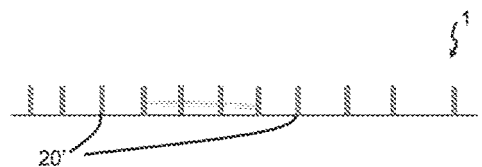
Figure 3A:
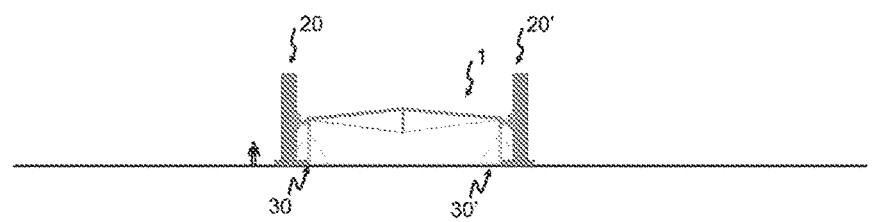

With reference to FIG. 3, a step is described, which follows the step described with reference to FIG. 2. As shown more particularly in FIG. 3a, the manufacturing device 10 comprises an additional tripod 30'.

The tripods 30 and 30' are placed in line with two load pick-up points of the airship 1, suitably arranged close to the ends supported by the two columns 20 and 20'.

Thereafter, the airship is placed on the tripods on each of its two load pick-up points.

In this state, the weight of the airship is distributed laterally on the two tripods 30 and 30', freeing the lifting columns 20 and 20'.

With reference to FIG. 4, a step is described, which follows the step described with reference to FIG. 3.

Figure 4B:
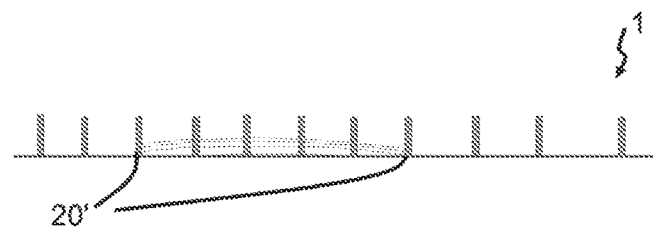
Figure 4A:
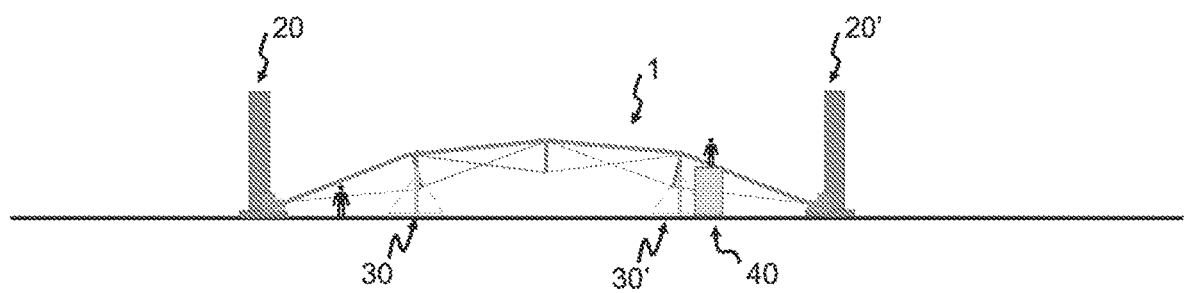

As shown more particularly in FIG. 4a, the lifting columns 20 and 20' are each moved into a second transverse position.

As is more particularly visible in FIG. 4a, various cables and stringers for fixing connection parts are implemented. The envelope panels are also installed, as well as the communication networks and the positioning of the helium cell.

As is best seen in FIG. 4b, this installation is carried out not only on a transverse part of the current section, but also all along the longitudinal extension of the current section.

Also, the entire structure of this section, including the curved upper parts of the transverse circular beams, the stringers, the skin, and all the fittings, is manufactured on the floor of the hangar.

It is observed that the presence of an operator on a work platform 40, raised to 3 meters in height, is necessary to carry out certain operations. As may be seen in FIG. 4a, the weight of the airship is distributed laterally on the lifting columns 20 and 20' and on each of the tripods 30 and 30' at the load pick-up points.

Figure 5B:
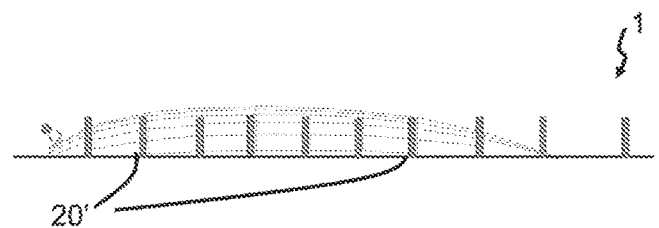
Figure 5A:
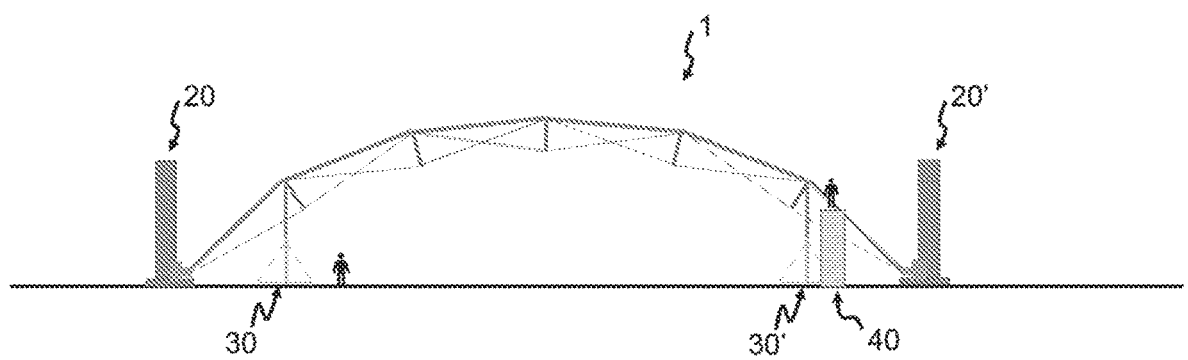

With reference to FIG. 5, a step is described, which follows the step described with reference to FIG. 4. To be able to pass from the current state of construction of the airship in FIG. 4 to the current state of construction of the airship in FIG. 5, the following steps have been carried out:

lifting the airship 1 so as to free each of the two tripods 30 and 30', the weight of the airship then being picked up only at the columns 20 and 20', like in the step described with reference to FIG. 2, moving the tripods 30 and 30' in line with two second load pick-up points suitably arranged close to the ends supported by the two columns 20 and 20', and placing the airship on the tripods on each of two second load pick-up points, the weight of the airship then only being picked up at the tripods 30 and 30', like in the step described with reference to FIG. 3, and moving each of the lifting columns 20 and 20' into a third transverse position; installing different cables and stringers to fix connection parts, as well as the envelope panels, the communication networks, and the positioning of the helium cell, the weight of the airship being distributed laterally on the lifting columns 20 and 20' and on each of the tripods 30 and 30' at the second load pick-up points, as described with reference to FIG. 4.

As is best seen in FIG. 5b, this installation is carried out not only on a transverse part of the current section, but also all along the longitudinal extension of the current section.

It is observed that the presence of an operator on the work platform 40, raised to 6 meters in height, which is itself moved laterally, is necessary to carry out certain operations.

Figure 6B:
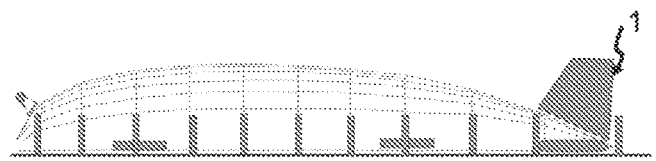
Figure 6A:
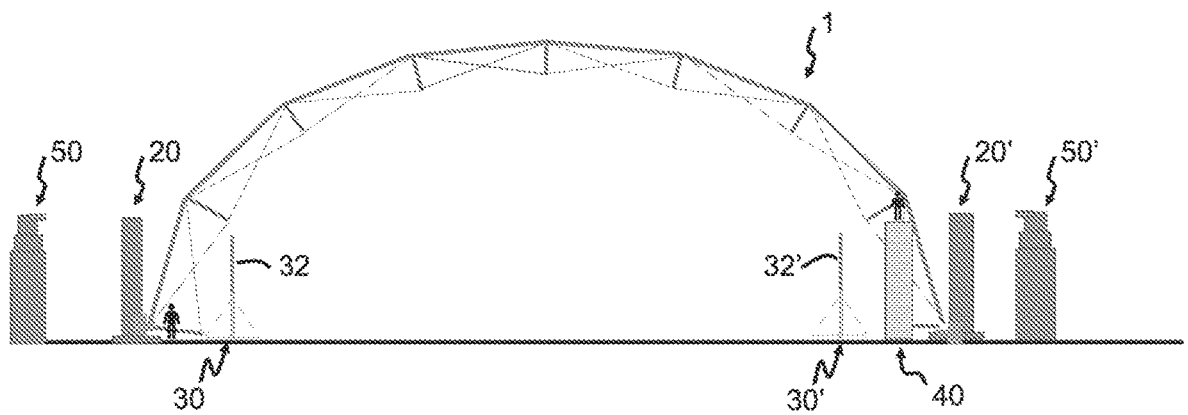

With reference to FIG. 6, a step is described, which follows the step described with reference to FIG. 5. FIG. 6 comprises a sub-FIG. 6a showing a front view of the current state of construction of the airship 1 and a sub-FIG. 6b showing a longitudinal view of the current state of construction of the airship 1.

In order to be able to pass from the current state of construction of the airship in FIG. 5 to the current state of construction of the airship in FIG. 6, the steps described with reference to the passage from the state of FIG. 4 to FIG. 5 have been carried out.

It is observed that the presence of an operator on the work platform 40, now raised to about 10 meters in height, which is itself moved laterally, is necessary to carry out certain operations.

Moreover, this phase comprises the installation of propulsion motors as well as the installation of the tail of the airship 1.

As shown more particularly in FIG. 6a, the manufacturing device 10 comprises additional lifting columns 50 and 50'.

Each of the additional lifting columns has a lifting truck arranged to be slidably mounted vertically on the lifting column, according to a displacement of 25 meters, and to be controlled by a control handle in the form of a reinforced shaft or a pedal.

Moreover, each of the two tripods 30 and 30' is provided at its upper end with a vertical arm, or mast, or vertical rod, 32 and 32', respectively.

Figure 7B:
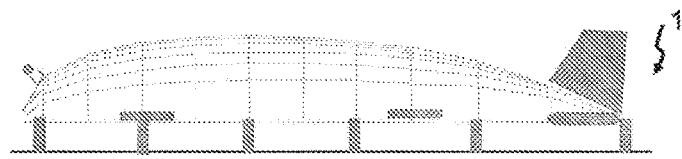
Figure 7A:
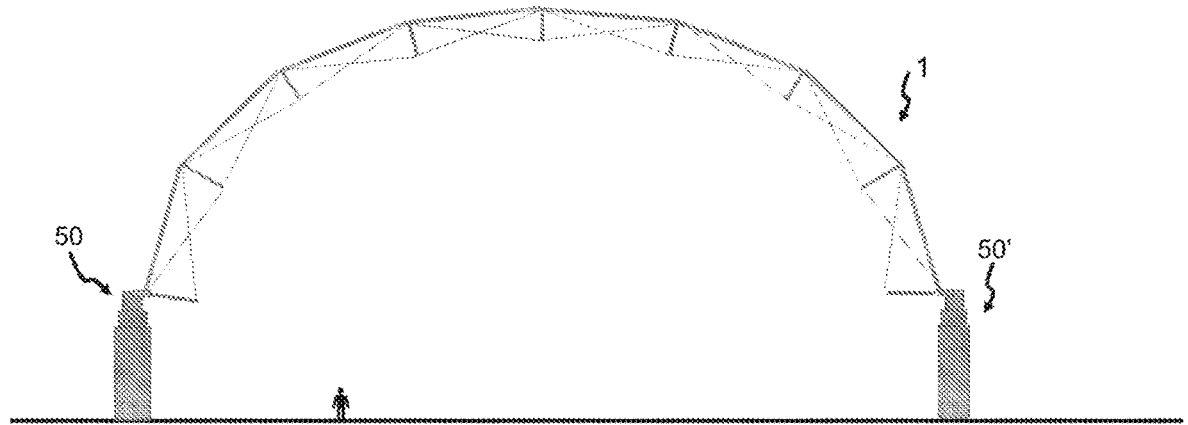

With reference to FIG. 7, a step is described, which follows the step described with reference to FIG. 6.

To be able to pass from the current state of construction of the airship in FIG. 5 to the current state of construction of the airship in FIG. 6, the steps described the following steps have been carried out:

lifting of the airship to the full height of the columns 20 and 20', so that the weight of the airship is picked up only by the columns 20 and 20', moving the tripods 30 and 30' in line with other load pick-up points suitably arranged near the ends supported by the two columns 20 and 20', and placing the airship on the vertical rods of the tripods on each of the other two load pick-up points, the weight of the airship then only being picked up at the tripods 30 and 30', removing the columns 20 and 20', picking up of the other load pickup points by the additional lifting columns 50 and 50', and removing the tripods 30 and 30' and work platform 40.

Figure 8B:
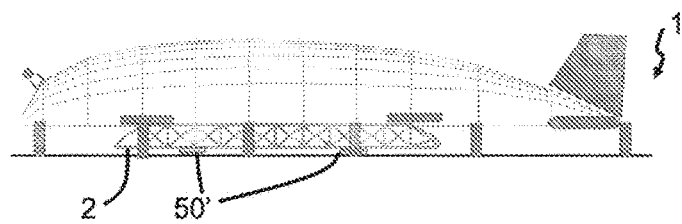
Figure 8A:
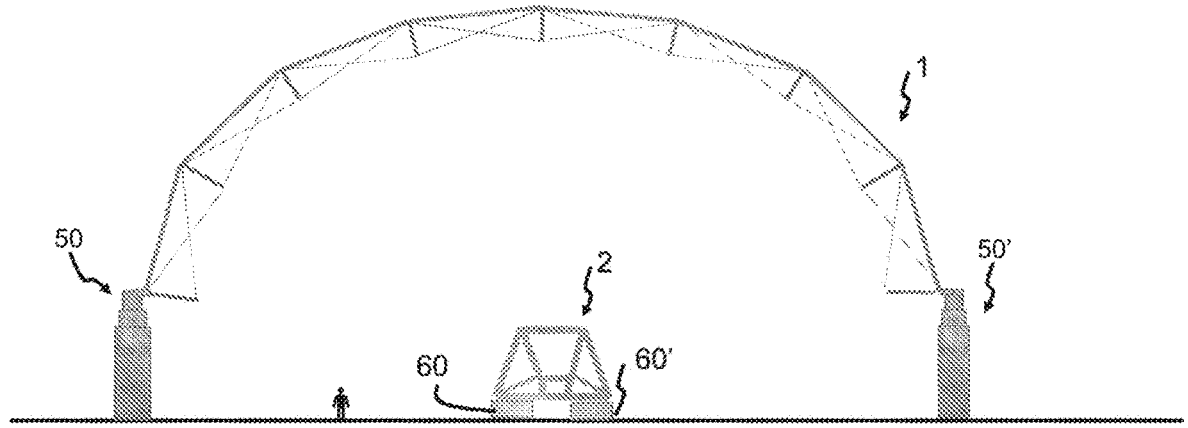

With reference to FIG. 8, a step is described, which follows the step described with reference to FIG. 7. In step 8, the cargo hold 2 of the airship 1 is moved under the structure erected up to that point.

The manufacturing device 10 comprises lifting tables 60 and 60' on which the cargo hold 2 rests.

With reference to FIG. 9, a step is described, which follows the step described with reference to FIG. 8.

The additional lifting columns 50 and 50' raise the airship 1 so that the uppermost section of the lower part of the structure of the airship 1 may be fixed on the structure already erected and on the cargo hold 2. To this end, each of the two tripods 30 and 30' is again placed with its arm under the points in elevation relative to the ground, on which the ends of the beams must be fixed.

In addition, two new tripods 30' and 30" are also placed under such points in elevation relative to the ground.

As is more particularly visible in FIG. 9a, various cables and stringers for fixing connection parts are placed on the uppermost section of the lower part. The installation of the connecting cables 90 is, in particular, facilitated by the absence of carrier gas, which limits the introduction of pretension. The envelope panels are also installed, as well as the communication networks and the positioning of the helium cell.

With reference to FIG. 10, a step is described, which follows the step described with reference to FIG. 9. The structure of the airship 1 is completely finished, and the cargo hold 2 of the airship is attached to the structure of the airship. The structure of the airship comprises several transverse beams 80, as well as the connecting cables 90. The transverse beams 80 may comprise lattice beams made of composite tubes made of pultruded carbon, and the cables 90 comprise solid section composite rods made of pultruded carbon. The airship 1 then comprises articulated connections 85 of the cables 90 to the coupling beams 80 and to the upper part of the structure. These articulated connections 85 may comprise metal parts.

Furthermore, the airship 1 is placed on a transport device 70 of the transport platform type having a plurality of wheels. It is then possible to carry out static tests on the terminal, but also to test the operation of the winches, specific to the airship, which may be embarked in the cargo hold for its operations, and which must therefore be tested.

At this point another embodiment of the method according to the present disclosure will be described, in which lifting winches are also implemented in combination with the aforementioned lifting columns, in an assembly phase called "equator."

In the equator phase, the upper part of the airship has already been assembled until it reaches the widest part (the equator) of the three-dimensional structure.

In this stage, small columns ensure geometric positioning, raising, and lowering of the load, while large columns take care of the geometric positioning performed by the small columns, support the load in X, Y, Z, and also contribute to raising and lowering the load.

Lifting winches (not shown) are arranged inside the assembly unit on one or more mechanical structures overhanging the airship being assembled. These winches are attached to small columns.

In a next phase of assembly above the equator, the small columns ensure the geometrical positioning, the support of the load in X, Y, Z, and the raising and lowering of the load, while the winches take care of the geometric positioning performed by the small columns, support the load in Z above the equator, and contribute to the raising and lowering of the load.

In a next phase of completion of the assembly, the small columns ensure the geometrical positioning, the support of the load in X, Y, Z, the raising and the lowering of the load, while the winches take care of the geometrical positioning carried out by the small columns, support of the load in Z above the equator, and contribute to the raising and the lowering of the load.

As will be readily understood, the present disclosure is not limited to the examples that have just been described, and numerous modifications may be made to these examples without departing from the scope of the invention as defined by the following claims. In addition, the various features, forms, variants, and embodiments of the present disclosure may be grouped together in various combinations as long as they are not incompatible or mutually exclusive.

The invention claimed is:

1. A method for erecting a structure of an aerostat by successive horizontal sections, starting with an upper horizontal section, comprising an iteration of the following steps, starting with a current state of manufacturing of the structure of the aerostat:
   lifting the current state of manufacturing of the structure, at first lifting points, by lifting means arranged in a current transverse position;
   placing a support device in line with second lifting points of the current state of manufacturing of the structure;
   transferring the current state of manufacturing of the structure from the lifting means to the support device;
   moving the lifting means to another transverse position; and
   fully assembling the horizontal section immediately below the current state of manufacturing of the structure on the structure.

2. The method of claim 1, further comprising a step of arranging a cargo hold structure inside the structure of the aerostat being erected.

3. The method of claim 2, further comprising placing the cargo hold structure on lifting tables.

4. The method of claim 2, wherein the iterative assembly step comprises mechanically coupling the cargo hold structure to the horizontal section being assembled by beams.

5. The method of claim 4, further comprising connecting determined points of an upper part of the horizontal sections of the structure that are already assembled to determined points of the beams to mechanically couple the cargo hold structure to the structure.

6. The method of claim 1, wherein the lifting means comprises winches arranged above the structure.

7. The method of claim 6, wherein the winches are implemented in an equator assembly phase in which the structure being erected reaches its maximum width.

8. The method of claim 1, wherein the transfer step comprises a lowering of the current state of manufacturing of the structure by the lifting means and placing the current state of manufacturing of the structure at rest on the support device.

9. The method of claim 1, wherein the structure of the aerostat is self-supporting at the current state of manufacturing of the structure.

10. The method of claim 1, wherein the lifting means comprises jacks.

11. The method of claim 1, wherein the first lifting points are arranged at transverse support ends of the aerostat.

12. The method of claim 1, wherein lifting the current state of manufacturing of the structure comprises lifting the current state of manufacturing of the structure at transverse ends of the structure.

13. A system for erecting a structure of an aerostat by successive horizontal sections, starting with an upper horizontal section, comprising:
   lifting columns arranged in a current transverse position, the lifting columns located and configured to lift a current state of manufacturing of the structure at first lifting points; and
   a support located in line with second lifting points of the current state of manufacturing of the structure,
   the lifting columns being configured to transfer the current state of manufacturing of the structure from the lifting columns to the support by lowering the current state of manufacturing of the structure to rest on the support, and
   the lifting columns being configured to move into another transverse position relative to the structure,
   wherein a horizontal section immediately below the current state of manufacturing of the structure is assembled onto the structure while the current state of manufacturing of the structure rests on the support.

14. The system of claim 13, further comprising lifting tables configured to arrange a cargo hold structure inside the structure.

15. The system of claim 14, wherein the cargo hold structure is mechanically coupled to beams of the horizontal section immediately below the current state of manufacturing of the structure.

16. The system of claim 15, wherein determined points of an upper part of the current state of manufacturing of the structure are connected to determined points of the beams to mechanically couple the cargo hold structure to the structure.

17. The system of claim 13, wherein the lifting columns comprise jacks.

18. The system of claim 13, wherein the lifting columns comprise winches arranged above the structure being erected.

* * * * *